UNITED STATES PATENT OFFICE.

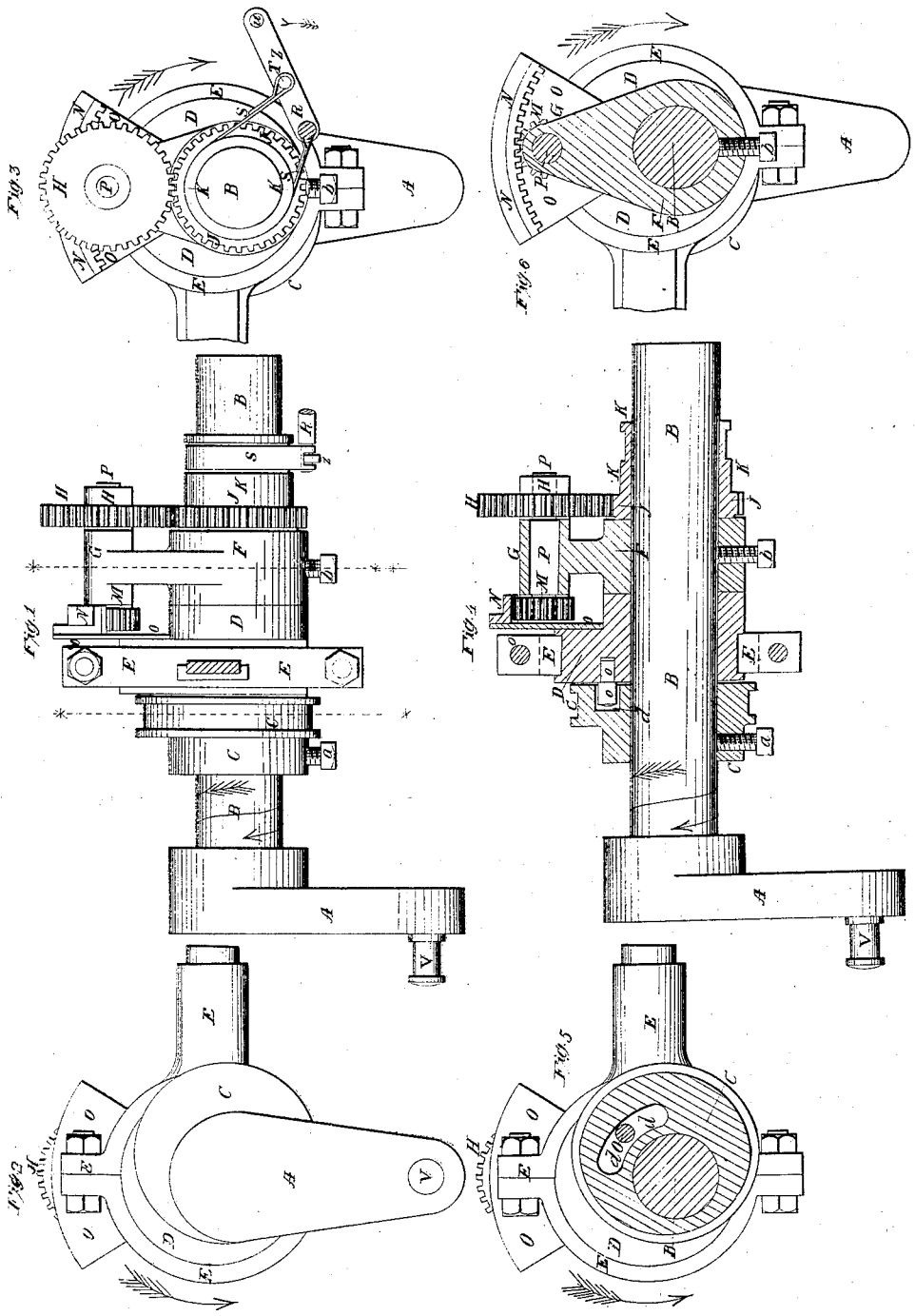

H. A. LUTTGENS, OF PATERSON, NEW JERSEY.

CUT-OFF REGULATOR FOR STEAM-ENGINES.

Specification of Letters Patent No. 12,064, dated December 12, 1854.

*To all whom it may concern:*

Be it known that I, H. A. LUTTGENS, of Paterson, in the county of Passaic and State of New Jersey, have invented certain new and useful Improvements in Apparatus to be Connected to the Governor of the Steam-Engine for the Purpose of Regulating and Controlling the Speed of the Engine by the Cut-Off; and I do hereby declare that the following is a full, clear, and exact description of the same, reference being had to the accompanying drawings, forming part of this specification, in which—

Figure I is a front elevation of the apparatus, Figs. II and III are side elevations of the same, Fig. IV is a section of the front elevation, with exception of the crank shaft and crank. Figs. V and VI are transverse sections of the shaft and part of the apparatus, taken in the lines marked * and ** in Fig. I.

Similar letters of reference indicate corresponding parts in each of the several figures.

My invention consists in a movable cut-off eccentric whose angular position in relation to the crank is controlled by mechanism which depends for its action upon a brake wheel, two spur wheels and a pinion gearing into a segment, attached to the cut-off eccentric, the mechanism receiving its impulse from the revolutions of the shaft. The brake wheel has one spur wheel secured to it and is fitted loosely upon the shaft, so as to turn freely upon it, but is confined lengthwise; the second spur wheel and the pinion are fitted to a spindle revolving freely in a bearing stationary upon and parallel to the crank shaft; this spur wheel gearing into the one secured to the brake wheel and the pinion into a segment attached to the eccentric. The eccentric itself is actuated upon by the friction, produced by the power necessary to move the cut-off valve, and tightness of the eccentric strap itself upon the cut-off eccentric, while the brake wheel is encircled by a friction band or strap, which is controlled by a governor so as to produce a greater or less amount of friction upon it. The apparatus is so adjusted, that when the engine is working at its proper speed, the governor shall produce just so much friction, of the brake strap on the brake wheel, as will balance the friction of the eccentric strap upon the cut-off eccentric, holding the eccentric upon the shaft in its respective angular position to the crank, but that as soon as the speed increases, or decreases it shall cause the governor to exert a greater or less amount of friction on the brake wheel, than the eccentric strap exerts upon the eccentric, thus causing the eccentric to alter its angular position in relation to the crank; a greater amount of friction on the brake wheel in part or entirely arresting its revolutions, causes the advance of the eccentric upon the shaft, thus increasing the cut-off, or diminishing the amount of steam admitted; a smaller amount of friction on the brake wheel, allows the friction of the eccentric strap, either in part or wholly to arrest the eccentric on the shaft, diminishing the cut-off, or increasing the amount of steam admitted. The cut-off eccentric is limited in its extreme positions by a pin secured to its face, which moves in a slot within the face of the main eccentric.

To enable others skilled in the art to make and use my invention I will proceed to describe its construction and operation.

A is the crank of a steam engine.

B is the crank shaft and V the crank pin.

C is the main eccentric, actuating the valve for the distribution of the steam in the cylinder; it is firmly held in its position upon the shaft B by set screw $a$, and is provided on its inner side with a slot $d$, within which moves freely the pin $o$, which is secured firmly to the face of the cut-off eccentric D. Eccentric D is fitted upon the shaft B, so as to turn freely upon it, being limited in its revolutions by pin $o$ within slot $d$. Eccentric D is encircled by the eccentric strap E, which connects it to the cut-off valve; it is also provided on one side with plate O and segment N, the whole being either cast together, or secured firmly by rivets or bolts. The pin $o$ includes in its range of motion an angle of 60 degrees, determining the length of the slot $d$, which also equals the range of motion of segment N, upon pinion M, giving an amount of steam admitted into the cylinder, from uninterrupted admission to 50 per cent. of the length of the stroke of the piston, which amount however may be modified as deemed proper, a range of motion equal to an angle of 130 degrees, giving an amount of steam admitted, from uninterrupted admission, to 4 per cent of the full stroke.

The extreme position of the segment N, measured in a line with that part of the segment, which in its extreme position, is in contact with the pinion M, or that position in which the expansion port remains open during the whole length of the stroke, forms an angle of 120 degrees with the center line of the crank A, measured on that side of the crank, in the direction of which it advances, it being taken for granted, that the connection of the main and cut-off eccentrics with their valves, is direct, without the intervention of rockers, or anything, which would reverse the motion of the valves; though if this latter mode should be adopted, the angle would be altered from 120 degrees to 60 degrees measured on that side of the crank, which recedes while in motion. The proportion of the throw of the main eccentric, to the cut-off eccentric is like 4 to $5\frac{1}{2}$, while, if a throw of 4 inches should be given to the main valve, and $5\frac{1}{2}$ inches to the cut-off valve, the length of the cut-off valve would be 4 inches, the distance between the expansion ports on the top of the main valve 5 inches, and the length of these ports $1\frac{1}{4}$ inches; the amount of lap of the main valve on its seat being $\frac{3}{8}$ of an inch, and lead $\frac{1}{16}$ of an inch.

F is a collar which is held firmly in its position by set screw $b$; it is extended into the form of a crank to provide a bearing G for the spindle P, which is fitted so as to turn freely within it, having the pinion M and spur wheel H fitted and keyed to its ends.

Brake-pulley K and spur-wheel J, which are cast in one piece are fitted so as to revolve freely upon shaft B. Spur wheel J gears into spur wheel H, and the face of the brake pulley is near its end, reduced in diameter, so as to form a groove to receive the brake strap S. One extremity of the strap S is fitted upon the stationary pin R, which is secured firmly to a part of the framing of the engine (not represented on drawing) and its other extremity is fastened by pin T to a lever which has its fulcrum at R, and is together with the brake strap, fitted upon the stationary pin R, so that downward pull at the pin U indicated by the arrow, will produce tightness and consequent friction of the straps S, upon the brake pulley K.

The governor producing the effect of tightening the brake strap may be of common construction, being connected to the brake strap in a manner producing increase of friction after increase of speed, and less or no friction after decrease of speed. The governor balls should be heavy and it should altogether be so constructed, as to give the greatest increase of pressure on the brake, in proportion to the increase of speed.

The operation is as follows: It may first be observed, that the cut-off eccentric D, by means of the friction of its eccentric strap, during the revolutions of the shaft B, is continually arrested, and the pin O, would consequently always remain in the end of the slot $d$, unless a power would be exerted greater or at least equal to the friction of the eccentric strap, in a way so as to advance the eccentric D upon shaft B, in the direction of its revolutions. This effect is produced by the brake strap S, which encircles the brake pulley K, in connection with the spur wheel T and H and pinion M, which gears into segment N, the latter forming part of eccentric D. The spindle P which turns freely within collar G, revolves around the center of shaft B, at a rate equal to the revolutions of the crank-shaft, the collar F being stationary upon the latter. While spindle P remains stationary within collar G, the several wheels will be at rest, the cut-off eccentric will not move upon the shaft or alter its angular position in relation to the crank, nor will the pin O alter its position within slot $d$; this state of rest is produced by an amount of friction upon the brake pulley K, sufficient to counterbalance the friction of the eccentric strap; however as soon as the friction upon the brake pulley increases, by increase of speed, producing a greater tightness of the brake strap, or diminishes, by decrease of speed, producing slackness of the brake-strap, the cut-off eccentric D, will either move in advance of, or retrograde upon the shaft, thus giving different admissions of steam in proportion to the work done by the steam engine.

The apparatus is capable of considerable modification, without altering its character, as for instance the brake K may be located upon a separate spindle parallel to the crank shaft B, provided with a spur wheel to gear into spur-wheel J; spur wheel J being fitted loosely upon crank shaft B, and left without the brake pulley K; also the governor may be directly connected to the brake strap S, without the intervention of a lever; however these and similar modifications are of no importance and represent mere modifications of the mechanical principle of the invention.

I have throughout described steam as the motive agent, but the apparatus is equally applicable to an engine impelled by any expansible of gas.

What I claim as my invention and desire to secure by Letters Patent is—

Operating the cut-off eccentric, which is fitted to turn freely on its shaft, by means of friction produced by the eccentric strap E, and the friction produced by a brake strap upon brake-pulley K, in connection with the gearing J, H, M and segment N, the spindle connecting pinion M and spur wheel H, revolving freely in a bearing stationary upon and parallel to the crank shaft, the mechanism receiving its impulse from the revolutions of the latter; the whole operating substantially as described, and to the effect, that any friction produced by the brake strap upon the brake pulley greater or lesser than necessary to counterbalance the friction of the eccentric strap, will cause the eccentric to turn upon the shaft, and alter its angular position in relation to the crank, the brake strap being operated upon by a steam engine governor of common construction.

H. A. LUTTGENS. [L. S.]

Witnesses:
 MOSES S. CRANE,
 J. H. DAY.